US010515312B1

United States Patent
Kubo et al.

(10) Patent No.: US 10,515,312 B1
(45) Date of Patent: Dec. 24, 2019

(54) NEURAL NETWORK MODEL COMPACTION USING SELECTIVE UNIT REMOVAL

(71) Applicant: Amazon Technologies, Inc., Seattle, WA (US)

(72) Inventors: Yotaro Kubo, Aachen (DE); George Jay Tucker, Cambridge, MA (US)

(73) Assignee: Amazon Technologies, Inc., Seattle, WA (US)

(*) Notice: Subject to any disclaimer, the term of this patent is extended or adjusted under 35 U.S.C. 154(b) by 901 days.

(21) Appl. No.: 14/984,847

(22) Filed: Dec. 30, 2015

(51) Int. Cl.
*G06N 7/00* (2006.01)
*G06N 3/08* (2006.01)

(52) U.S. Cl.
CPC ............. *G06N 7/005* (2013.01); *G06N 3/082* (2013.01)

(58) Field of Classification Search
None
See application file for complete search history.

(56) References Cited

U.S. PATENT DOCUMENTS

| | | | | |
|---|---|---|---|---|
| 2014/0180986 A1* | 6/2014 | Hinton | ................. | G06N 3/0454 706/21 |
| 2015/0006444 A1* | 1/2015 | Tamatsu | ................. | G06N 3/082 706/12 |
| 2015/0120632 A1* | 4/2015 | Campos | ................. | G06N 3/049 706/44 |
| 2016/0307098 A1* | 10/2016 | Goel | ...................... | G06N 3/082 |
| 2017/0039471 A1* | 2/2017 | Ogawa | ..................... | G06N 3/04 |

OTHER PUBLICATIONS

Murray, Kenton, and David Chiang. "Auto-sizing neural networks: With applications to n-gram language models." arXiv preprint arXiv:1508.05051 (2015). (Year: 2015).*
Xue, Jian, Jinyu Li, and Yifan Gong. "Restructuring of deep neural network acoustic models with singular value decomposition." In Interspeech, pp. 2365-2369. 2013. (Year: 2013).*
LeCun, Yann, John S. Denker, and Sara A. Solla. "Optimal brain damage." In Advances in neural information processing systems, pp. 598-605. 1990. (Year: 1990).*

(Continued)

*Primary Examiner* — Scott A. Waldron
*Assistant Examiner* — Casey R. Garner
(74) *Attorney, Agent, or Firm* — Knobbe, Martens, Olson & Bear, LLP

(57) ABSTRACT

The present disclosure is directed to the generation of a compact artificial neural network by removing individual nodes from the artificial neural network. Individual nodes of the artificial neural network may be deactivated randomly and/or selectively during training of the artificial neural network. In some embodiments, a particular node may be randomly deactivated approximately half of the time during processing of a set of training data inputs. Based on the accuracy of the results obtained when the node is deactivated compared to the accuracy of the results obtained when the node is activated, an activation probability may be generated. Nodes can then be selectively removed from the artificial neural network based on the activation probability.

20 Claims, 6 Drawing Sheets

(56) References Cited

OTHER PUBLICATIONS

Dahl, George E., Tara N. Sainath, and Geoffrey E. Hinton. "Improving deep neural networks for LVCSR using rectified linear units and dropout." In Acoustics, Speech and Signal Processing (ICASSP), 2013 IEEE International Conference on, pp. 8609-8613. IEEE , 2013. (Year: 2013).*

Srivastava, Nitish, Geoffrey Hinton, Alex Krizhevsky, Ilya Sutskever, and Ruslan Salakhutdinov. "Dropout: a simple way to prevent neural networks from overfitting." The Journal of Machine Learning Research 15, No. 1 (2014): 1929-1958. (Year: 2014).*

Huynh, Thuan Q., and Rudy Setiono. "Effective neural network pruning using cross-validation." In Proceedings. 2005 IEEE International Joint Conference on Neural Networks, 2005., vol. 2, pp. 972-977. IEEE, 2005. (Year: 2005).*

* cited by examiner

NEURAL NETWORK MODEL COMPACTION USING SELECTIVE UNIT REMOVAL

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a model may be implemented as an artificial neural network ("NN"). Artificial neural networks are artificial in the sense that they are computational entities, analogous to biological neural networks in animals, but implemented by computing devices. Output in NN-based models is obtained by doing a "forward pass." The forward pass involves multiplying large NN weight matrices, representing the parameters of the model, by vectors corresponding to input feature vectors or hidden intermediate representations. In recognition systems, such as systems designed to recognize speech, handwriting, faces, and the like, NN-based models may generate probability scores via the forward pass. The probability scores may indicate the probability that the input corresponds to a particular label, class, or the like.

The parameters of a NN can be set in a process referred to as training. For example, a NN-based model can be trained using training data that includes input data and the correct or preferred output of the model for the corresponding input data. Sets of individual input vectors ("mini-batches") may be processed at the same time by using an input matrix instead of a single input vector. The NN can repeatedly process the input data, and the parameters (e.g., the weight matrices) of the NN can be modified in what amounts to a trial-and-error process until the model produces (or "converges" on) the correct or preferred output. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
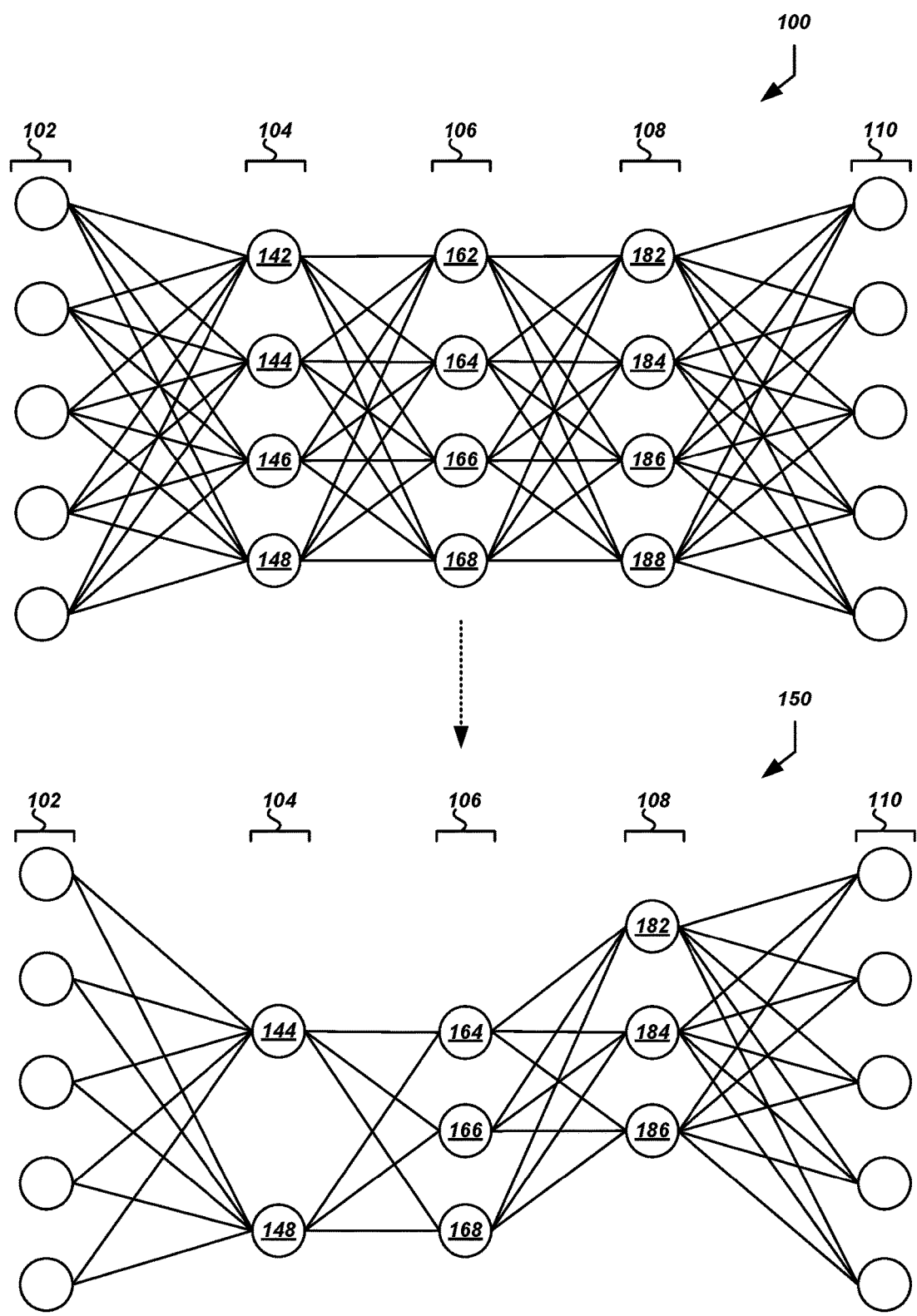
FIG. 1 is a diagram of an illustrative artificial neural network with multiple nodes arranged in layers, showing the removal of individual nodes.

The present disclosure is directed to the generation of a compact artificial neural network by removing individual nodes from the artificial neural network. Individual nodes of the artificial neural network may be deactivated randomly and/or selectively during training of the artificial neural network. In some embodiments, a particular node may be randomly deactivated approximately half of the time during processing of a set of training data inputs. Based on the accuracy of the results obtained when the node is deactivated compared to the accuracy of the results obtained when the node is activated, the node may be removed from the artificial neural network. For example, if the accuracy of the results obtained when the node is deactivated is equal to or greater than the accuracy of the results obtained when the node is activated, then an activation probability for the node may be adjusted toward zero; otherwise the activation probability for the node may be adjusted toward one. Over the course of processing several sets of training data, the activation probability for the node will converge on either zero or one. If the activation probability converges on zero, the node may be removed from the artificial neural network altogether (e.g., rather than simply deactivated). By performing this process for all or some subset of nodes of an artificial neural network, a more compact network may be generated without sacrificing accuracy. Thus, the artificial neural network may require less storage space, require less bandwidth to be transmitted, and may provide an improvement in performance due to fewer calculations being performed overall.

Generally described, artificial neural networks ("NNs"), including but not limited to deep neural networks ("DNNs"), have multiple layers of nodes. Illustratively, a NN may include an input layer, and output layer, and any number of intermediate or "hidden" layers between the input and output layers. The individual layers may include any number of separate nodes. Nodes of adjacent layers may be connected to each other, and each connection between the various nodes of adjacent layers may be associated with a respective weight. Some NNs have thousands of nodes and millions weights for connections between the nodes of all of the adjacent layers. Such NNs may consume a large amount of space when stored, a large amount of bandwidth when transmitted, and a large amount of processing resources when used due to the large number of calculations to be performed.

Some conventional methods of reducing the size of large NNs include obtaining sparse representations of the matrices in which the weights of the NN are arranged. For example, the weights associated with connections between nodes in two adjacent layers may be arranged in a matrix. Columns of the matrix may correspond to nodes of the previous layer, and rows of the matrix may correspond to nodes of the subsequent layer. The weight for a connection between any individual node of the previous layer and any individual node of the subsequent layer may be found at the corresponding intersection in the matrix. Some systems reduce the size of NNs by removing or setting to zero some portion of weights in the various weight matrices of the NNs. Although these systems achieve some degree of weight-level sparsity, they do not reduce the size (e.g., the "dimensionality") of the internal hidden layers of the NN. Thus, these conventional systems do not achieve the same degree of compaction as may be achieved by removing nodes from NNs.

Conventional NNs typically have a predetermined number of layers and a corresponding predetermined number of nodes for each layer. The predetermined numbers are determined by the humans designing the NNs. Thus, the number of nodes in each layer is often consistent from layer-to-layer (e.g., the hidden layers of a particular NN may each have the same number of nodes). In addition, the number of nodes in each internal hidden layer is often a round number, such as multiples of 2, 10, 100, 1000, or the like. However, the individual values for the weights connecting the nodes are trained using automated processes, and may appear to be random and varied. Using the random and conditional node removal processes described herein, the number of nodes in each internal hidden layer (or some subset thereof) is also trained using automated processes. Thus, the number of nodes in the internal hidden layers may appear to be random and varied, particularly when compared with the structure of human-designed NNs.

Some aspects of the present disclosure relate to determining which nodes can be removed from a NN without reducing (or substantially reducing) the accuracy of the NN. In some embodiments, the [1] accuracy of a NN in which nodes are randomly deactivated (e.g., using a technique similar to that used in "dropout" training) is compared to [2] the accuracy of the NN in which the nodes are all activated, but outputs of individual nodes are scaled based on the current estimation of a trainable activation probability for each node. Although they have similar names, the activation probability for each node is separate from—and not necessarily related in any way to—the activation function for each node used during a forward pass. Over the course of processing multiple sets of training data, the activation probability for each node is adjusted toward either 0.0 (always deactivated) or 1.0 (always activated), depending upon the NN results produced on training data. After training has been completed, the nodes with corresponding activation probabilities of 0.0 can be removed from the NN altogether. Such an activation probability is an empirical indicator that the absence of the node in the NN did not have a significant or threshold degree of negative impact on the accuracy of the NN, or that the NN is more actually accurate without the node. Thus, the node (and multiple other nodes with activation parameters equal to zero) can be safely deactivated in the NN that is deployed for use by customers or in a production environment. For example, deactivating a node in a NN that is to be deployed may include: removing the node from the NN altogether (e.g., removing its weights, biases, activation functions, and other components and parameters from the matrices and/or other data structures that define the NN); modifying the node to produce a constant output (e.g., zero or one); modifying the node to merely pass output from a previous layer to a subsequent layer without modifying the value; perform calculations using the node's parameters as-trained, and then multiply the output that is passed onto the next layer by a predetermined number (e.g., zero, one, or the activation probability for the node); etc. Advantageously, removal of nodes from the NN altogether reduces the size of the internal hidden layers and the NN itself.

Additional aspects of the present disclosure relate to methods of determining the activation probabilities for the nodes of a NN. During the dropout training method, a randomly chosen set of nodes is deactivated. Training data input is processed by the NN to produce output, such as a probability that the training data input corresponds to an expected classification. In some embodiments of the present disclosure, the same training data input is also processed by the NN with all nodes activated. In this additional processing, the output of the nodes may be scaled based on the current activation probabilities for each node (e.g., the output of a node with a 0.5 activation probability will be reduces by half, the output of a node with a 0.75 activation probability will be reduced by a quarter, etc.). A ratio of the outputs (e.g., a ratio of [1] the probability of the correct label as generated using the NN with randomly deactivated nodes to [2] the probability of the correct label as generated using the NN with all nodes activated) is then used as the basis for updating the activation probabilities.

Illustratively, the activation probabilities may initially be randomly generated, or may all be set to the same value, such as 0.5. If the ratio of outputs is less than 1.0 (e.g., the probability of the correct output is lower when calculated using a random deactivation of a particular node than when using the node), then the activation probability can be reduced (e.g., the node will be more likely to be deactivated in processing future training data inputs). Otherwise, the activation probability can be increased. In this manner, the activation probabilities can updated until they converge on either one or zero, and a determination can be made regarding permanently removing the node from the NN rather than just deactivating it, applying a weight to the output of the node as in traditional dropout training, or the like.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Example Artificial Neural Network

FIG. 1 illustrates an example NN 100 prior to removal of nodes using the techniques of the present disclosure. As shown, the NN 100 has a first layer 102 with a plurality of nodes, a second layer 104 with a plurality of nodes, a third layer 106 with a plurality of nodes, a fourth layer 108 with a plurality of nodes and a fifth layer 110 with a plurality of nodes. The specific number of layers and number of nodes per layer shown in FIG. 1 are illustrative only, and are not intended to be limiting. In some NNs, different numbers of layers and/or different numbers of nodes in individual layers may be used. For example, although each of the layers 102, 104, 106, 108, and 110 is shown with four or five nodes, in some NNs the layers may have hundreds or thousands of nodes, each layer may have the same or a different number of nodes as each other layer, etc. As another example, although five layers 102, 104, 106, 108, and 110 are shown, in some NNs there may be 3, 4, 6, 7, 10, or more layers.

Conceptually, a NN node may be thought of as a computational unit that computes an output value as a function of a plurality of different input values. The input values may include the output of nodes in a previous layer, multiplied by weights associated with connections between the nodes in the previous layer and the current node. When a NN processes input data in the form of a matrix of input vectors (e.g., a batch of training data input vectors), the NN may perform a "forward pass" to generate a matrix of output vectors. The input vectors may each include n separate data elements or "dimensions," corresponding to the n nodes of the NN input layer (where n is some positive integer). Each data element may be a value, such as a floating point number or integer. The forward pass includes multiplying the matrix of input vectors by a matrix representing the weights associated with connections between the nodes of the input layer and nodes of the next layer, and applying an activation function to the results. The process is then repeated for each subsequent NN layer.

Input to a NN, such as the NN 100 shown in FIG. 1, occurs at the first layer 102. A single input to the NN 100 may take the form of an input vector with n data elements, where n is the number of nodes in the first layer 102. The individual data elements may be numbers, such as floating point numbers, that have been generated by some other process (e.g., by extracting acoustic feature data from an audio input signal). In some cases, multiple input vectors may be input into—and processed by—the NN 100 at the same time. For example, when the NN 100 is being trained, a set of training data input vectors (e.g., a "mini batch") may be arranged as an input matrix. Each row of the input matrix may correspond to an individual training data input vector, and each column of the input matrix may correspond to an individual node of the first layer 102. The data element in any given input vector for any given node of the first layer 102 may be located at the corresponding intersection location in the input matrix.

A computing system, such as the computing system 500 shown in FIG. 5 and described in greater detail below or some other computing system, may execute a NN training process, such as the training process 200 shown in FIG. 2 and described in greater detail below. During the course of training, the computing system 500 may determine activation probabilities for all or some subset of nodes of the internal hidden layers 104, 106, and 108. If the activation probability for an individual node satisfies a criterion, then the computing system 500 may determine to remove the node from the NN 100 before deploying the NN for use in a production computing environment. For example, the criterion may be the activation probability meeting or falling below some threshold, such as 0.01, 0.001, 0.0001, 0.00001, etc. As another example, the criterion may be the activation probability being equal to some number, such as zero. Other criteria may be used instead or, in addition to, either or both of these examples.

The computing system 500 may determine activation probabilities for each of nodes 142-188. In determining the activation probabilities, the computing system 500 may use certain training parameters—known as "hyper parameters"—to ensure or increase the likelihood that the model will be compacted by a desired amount (e.g., 25%, 33%, 50%, etc.), thereby providing a NN that is a desired percentage of its original size (e.g., 75%, 67%, 50%, etc.). For example, the hyper parameters may be selected such that the activation probabilities of about 33% of the nodes of the internal hidden layers, including nodes 142, 146, 162, 188, converge on 0.0 over the course of training. The activation probabilities for the remaining hidden layer nodes, including nodes 144, 148, 164, 166, 168, 182, 184, and 186, may then converge on 1.0 over the course of training. Activation probabilities may not be determined for nodes of the input layer 102 and output layer 110 because it may be desirable for the input layer 102 and output layer 110 to maintain a predetermined number of nodes (e.g., the number of nodes for the input layer 102 correspond to the number of data elements in the input vectors, and the number of nodes in the output layer 110 correspond to the number of desired output data elements).

The computing system 500 may generate a compact NN 150 by removing nodes 142, 146, 162, 188 from the NN 100. The compact NN 150 may then be deployed for use in a production computing environment. As shown, the compact NN 150 does not include the removed nodes. In addition, rather than replacing the connections to/from the removed nodes with new connections that bypass the removed nodes, the compact NN does not include the connections to/from the removed nodes. Thus, the compact NN 150 is not only smaller than the original NN 100, but the compact NN 150 may also provide an improvement in performance due to the smaller number of computations that are performed when doing a forward pass with the compact NN 150.

Example Process for Training and Compacting Neural Networks

Figure 2:
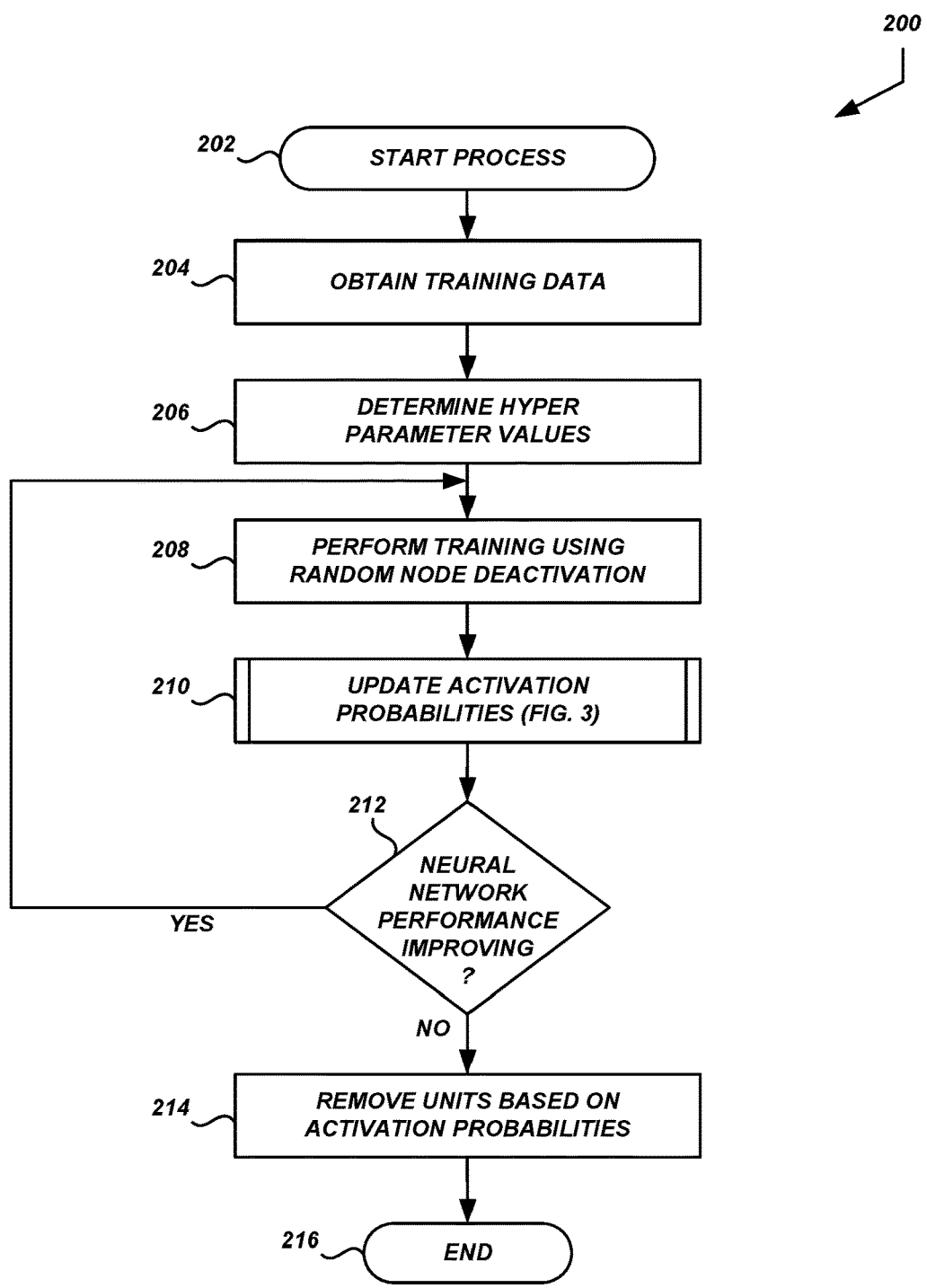
FIG. 2 is a flow diagram of an illustrative process for training an artificial neural network using selective deactivation and removal of individual nodes.

FIG. 2 is a flow diagram of an illustrative process 200 for training and compacting NNs. The process 200 begins at block 202. The process 200 may be embodied in a set of executable program instructions stored on a computer-readable medium, such as one or more disk drives, of a computing system, such as the computing system 500 shown in FIG. 5 and described in greater detail below. When the process 200 is initiated, the executable program instructions can be loaded into memory, such as RAM, and executed by one or more processors of the computing system 500. Although the process 200 is described with respect to the computing system 500 shown in FIG. 5, the description is illustrative only and is not intended to be limiting. In some embodiments, the process 200 or portions thereof may be performed serially or in parallel by multiple computing systems.

At block 204, the computing system 500 can obtain training data for use in training a NN, such as the NN 100 shown in FIG. 1. In some embodiments, the training data may include input vectors that include feature data for a recognition process to be performed (e.g., automatic speech recognition, facial recognition, handwriting recognition, etc.). Each training data input vector may be associated with a correct or otherwise expected output. The expected output can be used during the training process to determine how accurate the NN 100 was in processing the corresponding input vector. For example, the output of the NN 100 may be a distribution of probabilities, with each probability being a probability that the input corresponds to a particular label of a plurality of possible labels (e.g., for each subword unit of a language, the NN output may include a separate probability that the input vector is correctly classified as the subword unit). Each training data input vector may be associated with a single correct or expected classification. The goal of training is to increase the probability generated for that expected classification and reduce the probability generated for the other possible classifications.

In some embodiments, sets of training data input vectors (e.g., "mini batches") may be arranged as input matrices. Each row of an input matrix may correspond to an individual training data input vector, and each column of the input matrix may correspond to an individual node of the first layer 102 of the NN 100. The data element in any given input vector for any given node of the first layer 102 may be located at the corresponding intersection location in the input matrix 110.

At block 206, the computing system 500 can determine values for certain training parameters that affect how the NN 100 is trained and compacted. Such training parameters, also referred to as hyper parameters, are not parameters of the NN 100. As described above, the hyper parameters may relate to the desired compaction rate (e.g., it is desired to compact the NN 100 into 50% of its original size), the rate by which the activation probabilities may be adjusted for each iteration of the process (also referred to as the "learning rate"), etc. For example, a function p( ) used in updating activation probabilities may be defined as in equation [1] below:

$$p(\pi_u^{(l)} \mid \alpha, \beta, \gamma) = \frac{1}{Z}\left((\pi_u^{(l)})^{\alpha-1}(1-\pi_u^{(l)})^{\beta-1}\right)^{\gamma} \quad [1]$$

where $\pi_u^{(l)}$ is the activation probability of the $u^{th}$ node in the $l^{th}$ layer of the neural network; Z is the partition function; and $\alpha$, $\beta$, and $\gamma$ are hyper parameters. By setting $\alpha<1$ and $\beta<1$ (e.g., setting both equal 0.9), the function goes to infinity as $\pi_u^{(l)}$ approaches 0 or 1. The desired compaction rate for the NN (e.g., the desired size of the compacted NN as a percentage or ratio of the un-compacted NN) may be set by selecting values for $\alpha$ and $\beta$ such that the quotient $[\alpha/(\alpha+\beta)]$ equals or approximates the desired compaction rate. A value for $\gamma$ may be selected so that the desired compaction rate is not achieved too quickly (e.g., to ensure that the set of nodes remaining in the NN is the optimum set of nodes). By setting a sufficiently large $\gamma$ (e.g., setting $\gamma$ equal to the size of the training set), $\pi_u^{(l)}$ will always converge on 0 or 1.

At block 208, the computing system 500 can train the NN 100 using the dropout training method and a set (or "mini batch") of training data. The dropout training method includes randomly deactivating nodes of the NN 100 using a randomizing algorithm in which each node has a 50% chance of being deactivated at any time (e.g., for any instance of training data input, for any batch of training data input, etc.). The nodes that are deactivated are nodes in the internal hidden layers, rather than the input and/or output layers. In this way, the NN 100 may continue to receive input vectors and produce output that is the same size and/or type as when not randomly deactivating nodes. In some embodiments, deactivation of nodes may be implemented by multiplying their respective outputs by 0 or 1, depending upon whether the node is to be activated (e.g., output of nodes to be deactivated is multiplied by 0). Parameters of the NN are then updated using back propagation. In back propagation, a training error may be determined and used to update the individual parameters (e.g., weights) of the NN in order to reduce the training error. Illustratively, the training error may be computed using a function that is based on the difference between training data output and the expected output. A gradient may then be computed to determine how the weights in the weight matrices are to be adjusted to reduce the error. The adjustments may be propagated back through the NN 100 layer-by-layer.

At block 210, the computing system 500 can update the activation probabilities for the nodes of the NN 100. An example process 300 for updating activation probabilities is shown in FIG. 3 and described in greater detail below.

At decision block 212, the computing system 500 can determine whether performance of the NN 100 is improving. For example, the computing system 500 can determine whether the accuracy of the NN 100 during the current iteration of dropout training is better than the accuracy during a previous iteration. As another example, the computing system 500 can determine whether an improvement in accuracy during the current iteration of dropout training meets or exceeds some threshold. If the performance of the NN 100 is improving (or improving by at least a threshold level), the process 200 can return to block 208. Otherwise, the process 200 can proceed to block 214.

At block 214, the computing system 500 can remove nodes from the NN based on whether the activation probabilities determined above satisfy some criterion. For example, for each node of the NN 100, if the corresponding activation probability is 0.0 (or within a threshold amount of 0.0), then the node can be removed from the NN 100. As a result of removing all such nodes from the NN 100, a compact NN 150 can be generated.

Figure 3:
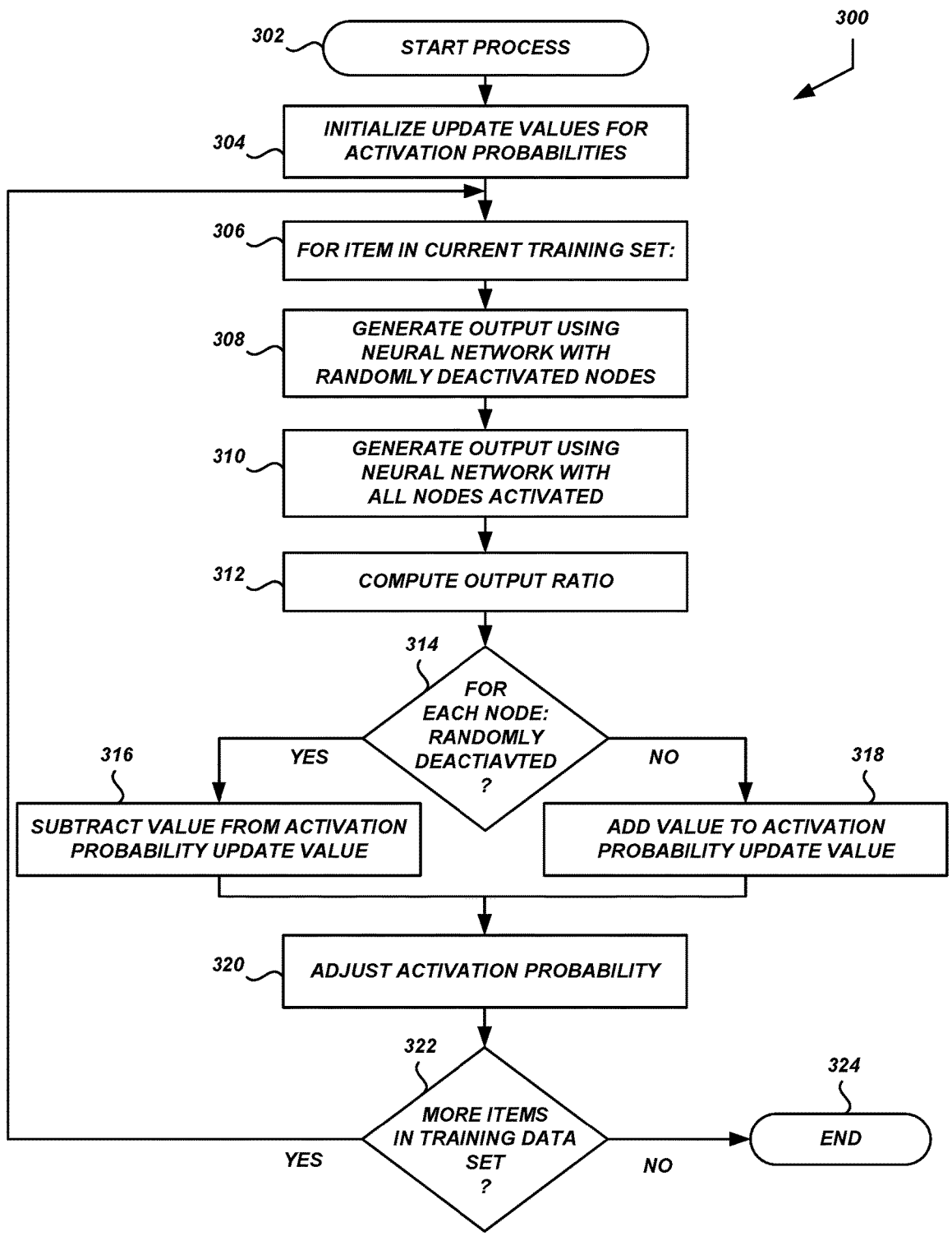
FIG. 3 is a flow diagram of an illustrative process for generating activation probabilities for use in selective deactivation and removal of individual nodes.

FIG. 3 is a flow diagram of an illustrative process 300 for training and compacting NNs. The process 300 begins at block 302. The process 300 may be embodied in a set of executable program instructions stored on a computer-readable medium, such as one or more disk drives, of a computing system, such as the computing system 500 shown in FIG. 5 and described in greater detail below. When the process 300 is initiated, the executable program instructions can be loaded into memory, such as RAM, and executed by one or more processors of the computing system 500. Although the process 300 is described with respect to the computing system 500 shown in FIG. 5, the description is illustrative only and is not intended to be limiting. In some embodiments, the process 300 or portions thereof may be performed serially or in parallel by multiple computing systems.

At block 304, the computing system 500 can initialize update values for the activation probabilities corresponding to each node of the NN 100 (or each node for which an activation probability is to be determined/updated). The update values—also referred to as "activation probability update values"—are values by which individual activation probabilities are to be updated. A goal of the processes 200 and 300 is to update the activation probabilities to each be (or be within a threshold amount of) 0.0 or 1.0, so that a determination can be made regarding removal of nodes from the NN 100. The update values may be collectively referred to as $\delta$, which may be an array or vector of separate update values for each activation probability. For example, $\delta_u^{(l)}$ is the update value for the activation probability of the $u^{th}$ node in the $l^h$ layer of the neural network (e.g., $\delta_u^{(l)}$ is the update value for $\pi_u^{(l)}$). In some embodiments, the update values may be initialized using a partial derivative of equation [1], as seen in equation [2] below:

$$\delta_u^{(l)} \leftarrow \frac{\partial}{\partial \pi_u^{(l)}} \log p(\pi_u^{(l)}) \quad [2]$$

At block 306, the computing system 500 can begin processing each item of the current set of training data. For example, the process 300 may iterate through each item of the same set of training data as was used in the current iteration of the process 200, described above, by executing blocks 306-320 for each training data item.

At block 308, the computing system 500 can generate NN output for a training data input using the NN 100 with a subset of the nodes of the NN (e.g., one or more nodes, but fewer than all nodes) randomly deactivated, as described above with respect to dropout training. In some embodiments, the computing system 500 can determine the probability that the training data input corresponds to each of a plurality of possible classifications. For example, the probability for the known correct classification may be determined according to function [3] below:

$$p(k_r|x_r,M,\Theta) \qquad [3]$$

where $k_r$ is the correct classification for the $r^{th}$ item of training data, $x_r$ is the input vector for the $r^{th}$ item of training data, M indicates which nodes of the NN 100 are randomly deactivated, and $\Theta$ is the current set of NN parameters (weights) as trained during the current iteration of process 200.

At block 310, the computing system 500 can generate NN output for a training data input using the NN 100 with all nodes activated. The output of the nodes may be adjusted to account for the expected output over time according to the corresponding activation probability for each node. For example, the output of a particular node may be scaled by multiplying its value by the current activation probability for the node. This process may be repeated for each node of the NN, or some subset thereof. In some embodiments, the computing system 500 can determine the probability that the training data input corresponds to each of a plurality of possible classifications. For example, the probability for the known correct classification may be determined according to function [4] below:

$$p(k_r|x_r,\Pi,\Theta) \qquad [4]$$

where $\Pi$ is the current set of activation probabilities and is used to scale the values of the nodes of the NN. In some embodiments, instead of scaling the output of the nodes, some nodes of the NN may output the average of the outputs with several activation configurations randomly chosen according to the current activation probability. In some embodiments, instead of scaling the output of the nodes, the nodes of the NN are deactivated according to their corresponding current activation probabilities such that over the course of many training data items, individual nodes are deactivated in inverse proportion to their corresponding activation probabilities.

At block 312, the computing system 500 can compute a ratio of NN output determined using (1) the NN 100 with randomly deactivated nodes and (2) the NN using selectively nodes activated or deactivated according to their corresponding activation probabilities. In some embodiments, a ratio w' may be computed as a ratio of functions [3] and [4] described above, as shown in equation [5] below:

$$\tilde{w} \leftarrow \frac{p(k_r|x_r,M,\Theta)}{\tilde{p}(k_r|x_r,\Pi,\Theta)} \qquad [5]$$

At decision block 314, the computing system 500 can determine, for each node of the NN 100 (or some subset thereof), whether function [3] was evaluated with the node deactivated for the current training data input. If so, the process 300 can proceed to block 316 separately for each such node. Otherwise, for each node that was not deactivated when evaluating function [3], the process 300 can proceed to block 318 separately for each such node.

At block 316, the computing system 500 can adjust, for each individual node that was deactivated as determined above, the corresponding activation probability update value. In some embodiments, the update value may be decreased using the ratio w' from equation [5], as shown in equation [6] below:

$$\delta_u^{(\ell)} \leftarrow \delta_u^{(\ell)} - (\tilde{w}+C)\frac{1}{1-\pi_u^{(\ell)}} \qquad [6]$$

where C is a control variate. The control variate can be used to speed up convergence of the activation probabilities on either zero or one. In some embodiments, by choosing an appropriate value for C (e.g., between 0.0 and −1.0), convergence may be sped up without negatively impacting the accuracy of the NN (e.g., without increasing the likelihood that a non-optimum set of nodes will be maintained). In some embodiments, the control variate can be used to ensure that when output produced using the NN 100 with a particular node deactivated is the same as output produced using the NN with the same node activated, then the output results are not used to update the activation probability for the node. In addition, the control variate can be used to ensure that the activation probability is not reduced if the output produced using the NN with the node deactivated is less accurate than the output produced using the NN with the node activated. In some embodiments, the control variate may be set such that C=−1.

At block 318, the computing system 500 can adjust, for each individual node that was activated as determined above, the corresponding activation probability update value. In some embodiments, the update value may be increased using the ratio w' from equation [5], as shown in equation [7] below:

$$\delta_u^{(\ell)} \leftarrow \delta_u^{(\ell)} + (\tilde{w}+C)\frac{1}{\pi_u^{(\ell)}} \qquad [7]$$

At block 320, the computing system can adjust the activation probabilities for each node (or some subset thereof) using the update values determined above. For example, the update values may be added to their corresponding activation probabilities. In some embodiments, the update values may be weighted before being added to the activation probabilities as shown in equation [8] below:

$$\pi \leftarrow \pi + \eta\delta \qquad [8]$$

where n is a learning rate that is typically <1. The learning rate may be used to ensure that activation probabilities are not changed by such a large amount that they overshoot their optimum values and possibly oscillate between values that are too high and too low. In some embodiments, the learning rate is a tunable parameter that may be set through a trial-and-error process.

At decision block 322, the computing system can determine whether there are more items in the current set of training data to be processed. If so, the process 300 can return to block 306. Otherwise, the process 300 can terminate at block 324.

Figure 4:
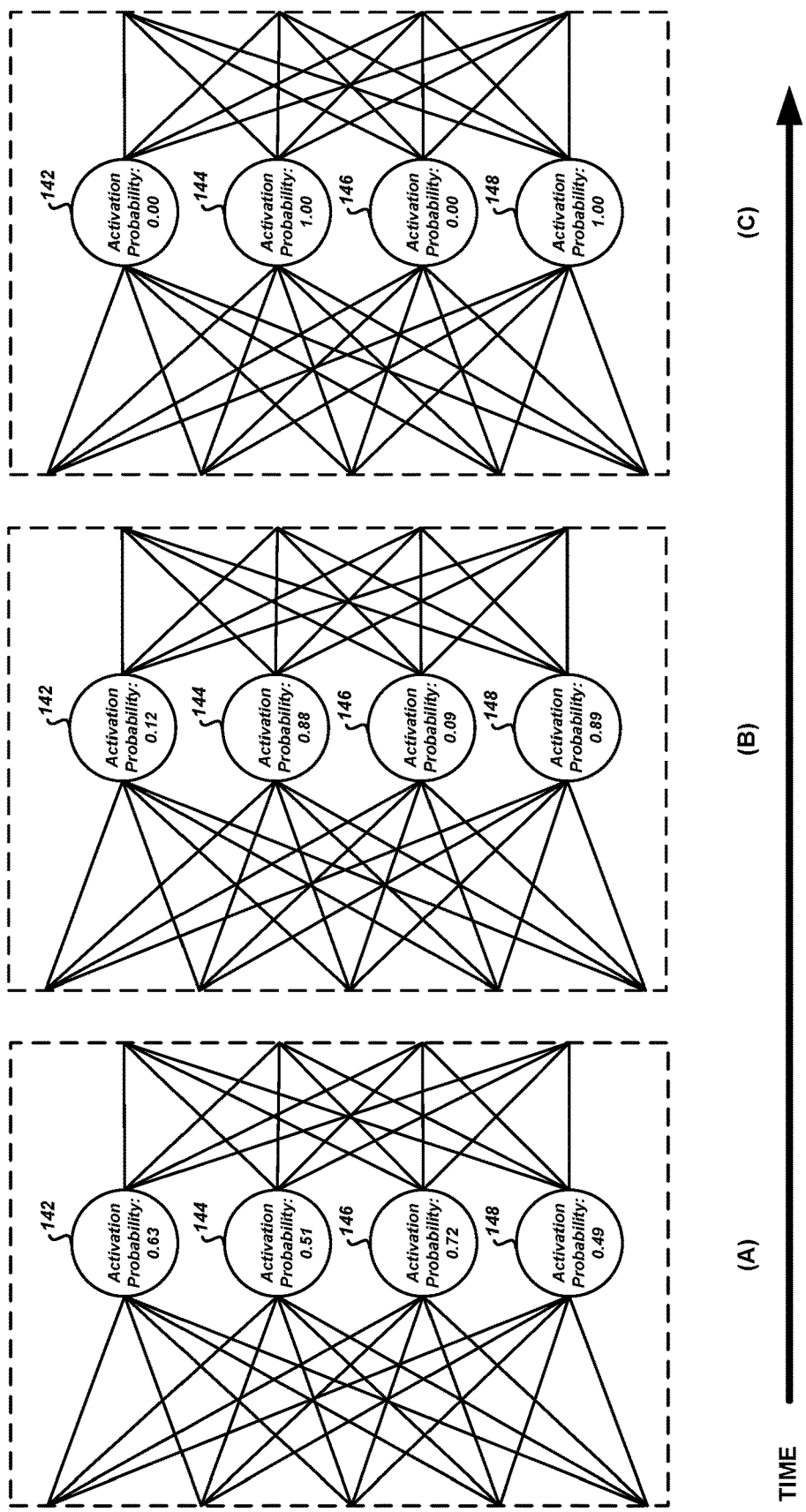
FIG. 4 is a diagram of an illustrative artificial neural network with multiple nodes arranged in layers, showing the convergence over time of activation probabilities for individual nodes.

FIG. 4 shows layer 104 of the NN 100 at various stages of training using the processes 200 and 300. As shown at time (A), the activation probabilities for nodes 142, 144, 146, and 148 have been initialized to different random values between 0.0 and 1.0. In some embodiments, the activation probabilities may each be initialized to the same value, such as 0.5. In such cases, time (A) may be reached after one or more iterations of the process 300.

At time (B), which may be reached after one or more iterations of the process 300, the activation probabilities for each node have begun to approach 0.0 or 1.0. At time (C), which may occur an additional iteration or plurality of iterations of the process 300 after time (B), the activation probabilities for nodes 142 and 146 have converged on 0.0, and the activation probabilities for nodes 144 and 148 have converged on 1.0. In this example, nodes 142 and 146 may be removed from the NN 100 as shown in FIG. 1, resulting in a NN 150 that is more compact.

Execution Environment

Figure 5:
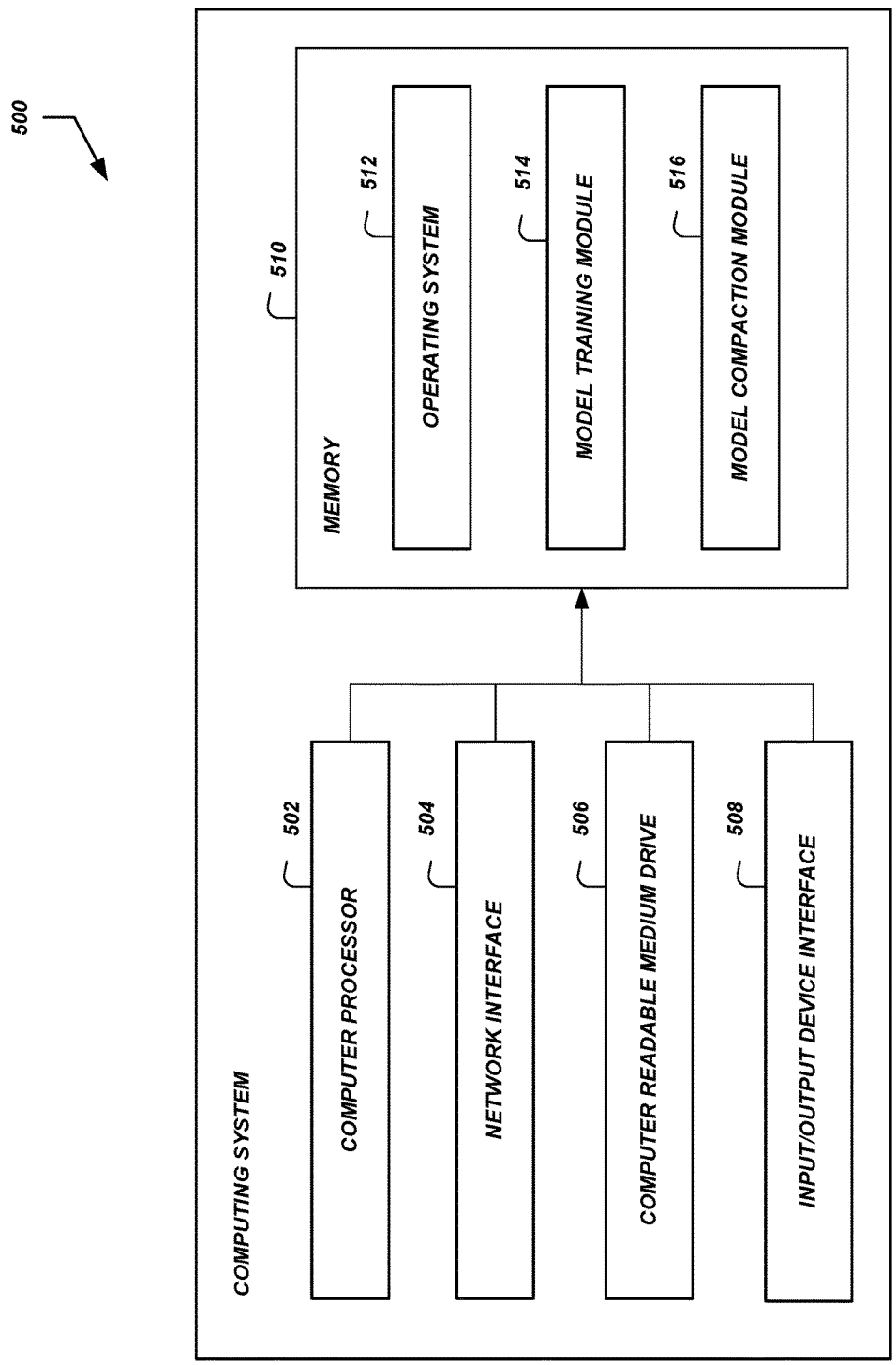
FIG. 5 is a block diagram of an illustrative computing system configured to implement training and compaction of artificial neural networks.

FIG. 5 illustrates an example computing system 500 configured to execute the processes and implement the features described above. In some embodiments, the computing system 500 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SDDs"), flash drives, and/or other persistent non-transitory computer-readable media; an input/output device interface 508, such as an IO interface in communication with one or more microphones; and one or more computer readable memories 510, such as random access memory ("RAM") and/or other volatile non-transitory computer-readable media.

The network interface 504 can provide connectivity to one or more networks or computing systems. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer readable memory 510, etc.

The computer readable memory 510 may include computer program instructions that the computer processor 502 executes in order to implement one or more embodiments. The computer readable memory 510 can store an operating system 512 that provides computer program instructions for use by the computer processor 502 in the general administration and operation of the computing system 500. The computer readable memory 510 can further include computer program instructions and other information for implementing aspects of the present disclosure For example, in one embodiment, the computer-readable memory 510 may include a model training module 514 that performs the processes 200 and/or 300 described above (or portions thereof) to train a NN. As another example, the computer-readable memory 510 may include a model compaction module 516 that performs the processes 200 and/or 300 described above (or portions thereof) to generate a compact NN. In some embodiments, multiple computing systems 500 may communicate with each other via their respective network interfaces 504, and can implement model training and/or model compaction separately (e.g., each computing system 500 may execute one or more separate instances of the processes 200 and/or 300), in parallel (e.g., each computing system 500 may execute a portion of a single instance of a process 200 and/or 300), etc.

Spoken Language Processing Using a Compact Neural Network

Figure 6:
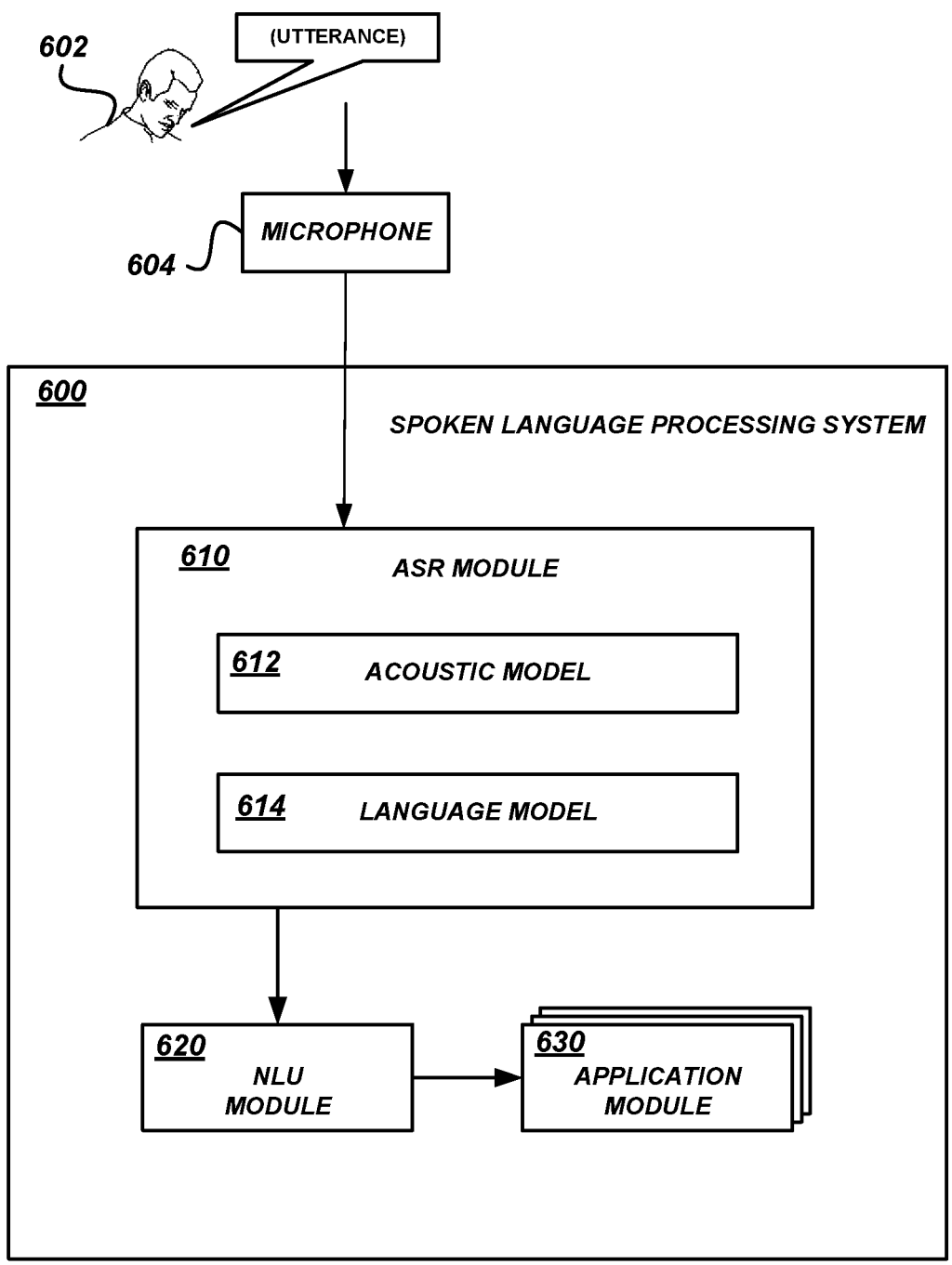
FIG. 6 is a block diagram of an illustrative spoken language processing system configured to use a spoken language processing model implemented as a compact neural network.

FIG. 6 illustrates an example environment in which a spoken language processing system 600 using a compact neural network may be implemented according to some embodiments. A user 602 may make utterances, such as spoken commands, queries, and the like. A microphone 604 may capture audio of the utterances and generate signals for processing by the spoken language processing system 600. For example, the microphone 604 may generate a signal with information regarding the captured audio of an utterance of the user 602, and the spoken language processing system 600 may process the signal to generate a transcription of the utterance and take some action in response to the utterance.

The spoken language processing system 600 can be or include any computing system, such as server computing device, desktop computing device, mainframe computer, some combination thereof, etc. In some embodiments, the spoken language processing system 600 can include several devices physically or logically grouped together, such as an application server computing device configured to perform speech recognition on an utterance and a database server computing device configured to store records and speech recognition models.

The spoken language processing system 600 can include an ASR module 610, an NLU module 620, and one or more application modules 630. In some embodiments, the spoken language processing system 600 can include various modules and components combined on a single device, multiple instances of a single module or component, etc. In some embodiments, the features and services provided by the spoken language processing system 600 may be implemented as web services consumable via a communication network. In further embodiments, the spoken language processing system 600 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The ASR module 610 may include acoustic model 612 to be used on acoustic features of audio data (e.g., a signal generated by the microphone 604) to generate transcription hypotheses regarding which word or subword units (e.g., phonemes) correspond to an utterance represented by the audio data. The ASR module 610 may also include a language model 614 to be used to determine the most likely transcription of the utterance using the acoustic model hypotheses. The NLU module 620 may include a named entity recognition model to be used on transcriptions generated by the ASR module to generate semantic representations of user utterances that may be acted upon by, e.g., an application module 630. In some embodiments, one or more of the acoustic model 612, language model 614, named entity recognition model, or other spoken language processing model may be implemented as an artificial neural network, such as a compact artificial neural network described elsewhere herein.

In operation, the spoken language processing system 600 can obtain data regarding an utterance of a user. The ASR module 610 or some other component of the spoken language processing system 600 may process the signal to, e.g., generate a sequence of feature vectors that include data regarding the acoustic features of the utterance. The ASR module 610 may process the feature vectors generated above using the acoustic model 612 to generate transcription hypotheses regarding the words in the utterance. The ASR module 610 may then process the data that it generated using the acoustic model to determine or select a most-likely correct transcription for the utterance. For example, the ASR module 610 may use the language model 614 to process transcription hypotheses and determine which one is most likely to be correct.

Illustratively, the acoustic model 612, language model 614, or any other spoken language processing model may be implemented as a compact artificial neural network, such as the compact NN 150 illustrated in FIG. 1. Input into the compact NN 150 may be in the form of an input vector having a quantity of data elements corresponding to a quantity of nodes of the input layer 102. The input vector, or data derived therefrom, may be multiplied by a first matrix of weights associated with connections between nodes of the input layer 102 and nodes of the first internal layer 104. An activation function may be applied at each node of the first internal layer 104 to at least a portion of a product of the previous matrix-vector multiplication. Output from the activation function of each node of the first internal layer 104 may then be arranged as a vector and multiplied by a second matrix of weights associated with connections between nodes of the first internal layer 104 and the second internal layer 106.

As shown, the second internal layer 106 has a different quantity of nodes than the first internal layer 104. This is due to the removal or other deactivation of nodes during generation of the compact NN 150, as described in greater detail above. Accordingly, the second weight matrix has a different quantity of columns than rows, corresponding to the reduced number of active nodes of the first internal layer 104 and the reduced number of active nodes of the second internal layer 106, respectively. An activation function may be applied at each node of the second internal layer 106 to at least a portion of a product of the previous matrix-vector multiplication. The process may then be repeated for each subsequent layer of the compact NN 150 to produce neural network output at the output layer 110.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    under control of a computer system comprising one or more hardware processors configured to execute specific computer-executable instructions,
        obtaining data defining an artificial neural network, the artificial neural network comprising an input layer, an output layer, and a plurality of internal layers, wherein the artificial neural network has been previously trained using training data comprising a plurality of training data input vectors;
        determining, using a randomizing algorithm, to deactivate a first node of a first layer of the plurality of internal layers;
        deactivating the first node, wherein deactivating the first node comprises configuring the first node to produce a constant output for any input;
        generating, using the artificial neural network with the first node deactivated, a first probability that a training data input vector of the plurality of training data input vectors corresponds to an expected classification;
        generating, using the artificial neural network with the first node activated, a second probability that the training data input vector corresponds to the expected classification;
        determining a first ratio of the first probability with respect to the second probability;
        subtracting a second ratio from an activation probability update value to generate a new activation probability update value, wherein the second ratio comprises a ratio of the first ratio with respect to an activation probability for the first node;
        generating a new activation probability for the first node using the new update value and the activation probability, wherein the new activation probability comprises a probability that the first node is to be activated;
        determining to remove the first node from the artificial neural network based on a value of the new activation probability being below a threshold value; and
        generating an updated artificial neural network by removing the first node from the artificial neural network, wherein the updated artificial neural network requires fewer storage resources than the artificial neural network due to the first node being excluded.

2. The computer-implemented method of claim 1, further comprising determining the activation probability update value by computing a gradient of the activation probability, wherein a first term of the gradient comprises the activation probability raised to a first exponent, wherein a second term of the gradient comprises the activation probability subtracted from a value of one and raised to a second exponent, and wherein a ratio of the first exponent with respect to a sum of the first exponent and the second exponent comprises a desired compaction rate for the artificial neural network.

3. The computer-implemented method of claim 1, wherein generating the new activation probability comprises:
    selecting a weighting factor based on a desired rate for modifying the activation probability over a single set of training data input vectors;
    applying the weighting factor to the new update value to generate a weighted update value; and
    adding the weighted update value to the activation probability.

4. The computer-implemented method of claim 1, wherein removing the first node from the artificial neural network comprises removing data regarding parameters of the first node from the data defining the artificial neural network.

5. A computer-implemented method comprising:
    under control of a computer system comprising one or more hardware processors configured to execute specific computer-executable instructions,
        deactivating at least a first node of an artificial neural network, wherein the artificial neural network comprises a plurality of nodes;
        generating, using the artificial neural network with the first node deactivated, first training data output from a training data input;
        generating, using the artificial neural network with the first node activated, second training data output from the training data input;
        computing a first ratio of the first training data output with respect to the second training data output;
        generating an activation probability for the first node based at least partly on the first ratio, wherein the activation probability comprises a probability that the first node is to be activated;
        determining to deactivate the first node in an updated version of the artificial neural network based on the activation probability; and
        generating the updated version of the artificial neural network with at least the first node deactivated, wherein evaluating an input vector using the updated version of the artificial neural network requires fewer calculations than evaluating the input vector with the artificial neural network.

6. The computer-implemented method of claim 5, wherein generating the updated version of the artificial neural network with at least the first node deactivated comprises one of: excluding, from data defining the updated version of the artificial neural network, data regarding parameters of the first node; configuring the updated version of the artificial neural network to produce a constant output value for the first node independent of input to the first node; or configuring the first node to pass a value from a previous layer to a subsequent layer.

7. The computer-implemented method of claim 5, wherein generating the activation probability comprises:
   determining that the first training data output was generated using the artificial neural network with the first node deactivated;
   computing a second ratio of the first ratio with respect to a previously-generated activation probability for the first node; and
   subtracting the second ratio from the previously-generated activation probability.

8. The computer-implemented method of claim 7, wherein generating the activation probability further comprises:
   selecting a weighting factor based on a desired rate for modifying the activation probability over a single set of training data inputs; and
   applying the weighting factor to the second ratio.

9. The computer-implemented method of claim 5, wherein the first training data output comprises a first probability that the training data input corresponds to an expected classification, wherein the second training data output comprises a second probability that the training data input corresponds to the expected classification, and wherein the first ratio comprises a ratio of the first probability with respect to the second probability.

10. The computer-implemented method of claim 5, wherein determining to deactivate the first node is based at least partly on the activation probability satisfying a criterion, wherein the criterion comprises one of: a value of the activation probability being equal to zero; or a value of the activation probability falling below a threshold.

11. The computer-implemented method of claim 5, further comprising determining, prior to deactivating at least the first node of the artificial neural network, to deactivate at least the first node of the artificial neural network using a randomizing algorithm.

12. The computer-implemented method of claim 5, wherein deactivating at least the first node of the artificial neural network comprises multiplying a value of the first node by zero.

13. The computer-implemented method of claim 5, further comprising:
   determining a compaction rate for the updated version of the artificial neural network, wherein the compaction rate indicates a relative size of the updated version of the artificial neural network with respect to the artificial neural network; and
   generating an activation probability for the first node based at least partly on the compaction rate.

14. The computer-implemented method of claim 5, further comprising:
   adjusting a value of the activation probability based on a plurality of iterations of generating output using the artificial neural network; and
   determining that the activation probability has converged on a threshold value, wherein the determining to deactivate the first node is based on the determining that the activation probability has converged on the threshold value.

15. The computer-implemented method of claim 14, further comprising determining an activation probability update value based on the plurality of iterations, wherein the adjusting the value of the activation probability is performed using the activation probability update value after the plurality of iterations.

16. The computer-implemented method of claim 5, further comprising:
   generating a second activation probability for a second node of the plurality of nodes, wherein the second activation probability is different than the activation probability, and wherein the second activation probability comprises a probability that the second node is to be activated during a next iteration of generating output using the artificial neural network; and
   determining not to deactivate the second node based on a value of the second activation probability satisfying a threshold value.

17. A system comprising:
   a computer-readable memory storing executable instructions; and
   one or more processors programmed by the executable instructions to at least:
      obtain data defining an artificial neural network, the artificial neural network comprising an input layer, an output layer, and a plurality of internal layers, wherein the plurality of internal layers comprises a first internal layer adjacent to a second internal layer;
      generate first output data using the artificial neural network with a first node the first internal layer deactivated;
      generate second output data using the artificial neural network with the first node activated;
      generating an activation probability for the first node based at least partly on a ratio of the first output data with respect to the second output data, wherein the activation probability comprises a probability that the first node is to be activated;
      deactivate the first node in an updated version of the artificial neural network based at least partly on the activation probability, wherein in the updated version of the artificial neural network the first internal layer comprises a first quantity of nodes and the second internal layer comprises a second quantity of nodes, and wherein the second quantity is different than the first quantity;
      obtain an input vector comprising data regarding a spoken utterance;
      multiply the input vector by a first weight matrix to generate a first internal vector, wherein the first weight matrix comprises weights associated with connections between nodes of the input layer and nodes of the first internal layer;
      multiply the first internal vector by a second weight matrix to generate a second internal vector, wherein the second weight matrix comprises weights associated with connections between nodes of the first internal layer and nodes of the second internal layer, wherein a quantity of columns of the second weight matrix is equal to the first quantity of nodes, and wherein a quantity of rows of the second weight matrix is equal to the second quantity of nodes;
      generate artificial neural network output using the second internal vector; and
      determine a transcription of the spoken utterance using the artificial neural network output.

18. The system of claim 17, wherein a plurality of weights of the second weight matrix, corresponding to a plurality of nodes deactivated in the second internal layer, have been removed from the second weight matrix.

19. The system of claim 17, wherein a node of the second quantity of nodes is configured to produce a constant output independent of input to the node.

20. The system of claim 17, wherein each individual internal layer of the plurality of internal layers comprises a different quantity of nodes than each other internal layer of the plurality of internal layers.

\* \* \* \* \*

UNITED STATES PATENT AND TRADEMARK OFFICE
CERTIFICATE OF CORRECTION

PATENT NO. : 10,515,312 B1
APPLICATION NO. : 14/984847
DATED : December 24, 2019
INVENTOR(S) : Yotaro Kubo It is certified that error appears in the above-identified patent and that said Letters Patent is hereby corrected as shown below:

In the Specification

In Column 8, Line 44, delete "1$^h$" and insert --1$^{th}$--.

Signed and Sealed this
Twenty-fourth Day of March, 2020

Andrei Iancu
*Director of the United States Patent and Trademark Office*